(12) United States Patent
Cao et al.

(10) Patent No.: US 12,439,705 B2
(45) Date of Patent: Oct. 7, 2025

(54) TRITIUM DETECTION DEVICES AND METHODS OF MAKING AND USE THEREOF

(71) Applicant: Ohio State Innovation Foundation, Columbus, OH (US)

(72) Inventors: Lei Raymond Cao, Columbus, OH (US); Praneeth Kandlakunta, Columbus, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 299 days.

(21) Appl. No.: 18/212,925

(22) Filed: Jun. 22, 2023

(65) Prior Publication Data

US 2023/0420597 A1 Dec. 28, 2023

Related U.S. Application Data

(60) Provisional application No. 63/355,170, filed on Jun. 24, 2022.

(51) Int. Cl.
| | | |
|---|---|---|
| *H10F 30/298* | (2025.01) | |
| *G01N 27/12* | (2006.01) | |
| *G01N 33/00* | (2006.01) | |
| *H10F 30/00* | (2025.01) | |
| *H10F 77/20* | (2025.01) | |

(52) U.S. Cl.
CPC ......... *H10F 30/298* (2025.01); *G01N 27/129* (2013.01); *G01N 33/0027* (2013.01); *H10F 30/301* (2025.01); *H10F 77/20* (2025.01)

(58) Field of Classification Search
CPC ...... H01F 30/298; H01F 20/301; H01F 77/20; G01N 27/129; G01N 33/0027
See application file for complete search history.

(56) References Cited

U.S. PATENT DOCUMENTS 10,580,544 B2 * 3/2020 Fenner .................. A61N 1/378
11,200,997 B2 * 12/2021 Cabauy ............... H10F 77/1248

FOREIGN PATENT DOCUMENTS

EP         2426483 A1 *  3/2012  ............. G01N 27/12

OTHER PUBLICATIONS

Ludlum Measurements, Ludlum Model 44-110 & 44-110-1 Large Area Tritium Detectors, https://ludlums.com/images/product_manuals/M44-110_&_M44-110-1.pdf accessed Jun. 5, 2025, pp. 1-16 (Year: 2013).*

(Continued)

*Primary Examiner* — Kristina M Deherrera
*Assistant Examiner* — Jean F Morello
(74) *Attorney, Agent, or Firm* — Meunier Carlin & Curfman LLC

(57) ABSTRACT

Disclosed herein are tritium detection devices and methods of making and use thereof. For example, disclosed herein are tritium detection devices comprising: a tritium detection region comprising a tritium absorption layer and an anti-diffusion layer; a Schottky contact region comprising a Schottky contact layer; a semiconductor layer, the semiconductor layer being a layer comprising a semiconductor; an epitaxial semiconductor layer, the epitaxial semiconductor layer being an epitaxial layer of the semiconductor; and an Ohmic contact layer.

20 Claims, 6 Drawing Sheets

(56) References Cited

OTHER PUBLICATIONS

Huang Jr et al., Investigation of Hydrogen-Sensing Characteristics of a Pd/GaN Schottky Diode. Ieee Sensors Journal, 2011. 11(5): p. 1194-1200.

Kim CK et al. A study on a platinum-silicon carbide Schottky diode as a hydrogen gas sensor. Sensors and Actuators B: Chemical 66, No. 1-3 (2000): 116-118.

Pan L et al. Determination of X-ray detection limit and applications in perovskite X-ray detectors. Nat Commun 12, 6258 (2021). https://doi.org/10.1038/s41467-021-25648-7.

Pearton SJ et al. GaN-based diodes and transistors for chemical, gas, biological and pressure sensing, Journal of Physics—Condensed Matter, 2004, 16(29), R961-R994.

\* cited by examiner

TRITIUM DETECTION DEVICES AND METHODS OF MAKING AND USE THEREOF

CROSS-REFERENCE TO RELATED APPLICATIONS

This application claims the benefit of priority to U.S. Provisional Application No. 63/355,170 filed Jun. 24, 2022, which is hereby incorporated herein by reference in its entirety.

BACKGROUND

Tritium is an isotope of hydrogen that emits fast electrons (beta particles) with an average energy of 5.68 keV while decaying at a half-life of 12.3 years. The beta particles emitted from tritium can only travel a maximum distance of 7 mm in air. They will not pass-through human skin and can be easily shielded with a piece of thin plastic. These features make the detection of tritium extremely difficult.

The concept of using nuclear reactors to thermochemically produce hydrogen is a large area of study on ways to utilize nuclear energy. A hydrogen-based economy could dramatically reduce the use of fossil fuels and global greenhouse gas emission from energy production. But tritium is produced as a significant by-product in nuclear reactor systems, including the existing light water reactors, non-light water reactors, and nuclear powered hydrogen production process. Tritium is also part of nuclear waste that exists in fuel cycle facilities and in nuclear waste disposal locations. Environmental monitoring of tritium is important due to its role as an indicator of nuclear activity. Monitoring of tritium in secondary and ternary reactor coolants is important in order to determine the amount of radioactive material leaving the plant. Advanced reactor designs will require instrumentation and sensors that must withstand harsh environments of high temperature, pressure, radiation field, and hydrogen concentration.

Given the extremely low concentration of tritium in the atmosphere, devices and methods that can detect tritium with high sensitivity are still needed. The devices and methods discussed herein address this and other needs.

SUMMARY

In accordance with the purposes of the disclosed devices and methods as embodied and broadly described herein, the disclosed subject matter relates to tritium detection devices and methods of making and use thereof.

Described herein are tritium detection devices comprising: a tritium detection region comprising: a tritium absorption layer; and an anti-diffusion layer; a Schottky contact region comprising a Schottky contact layer; a semiconductor layer, the semiconductor layer being a layer comprising a semiconductor; an epitaxial semiconductor layer, the epitaxial semiconductor layer being an epitaxial layer of the semiconductor; and an Ohmic contact layer; wherein the epitaxial semiconductor layer is disposed on top of and in physical contact with the semiconductor layer; wherein the tritium detection region covers a first portion of the epitaxial semiconductor layer and the Schottky contact region covers a second portion of the epitaxial semiconductor layer; wherein the anti-diffusion layer is disposed on top of and in physical contact with the first portion of the epitaxial semiconductor layer; wherein the tritium absorption layer is disposed on top of and in physical contact with the anti-diffusion layer, such that the anti-diffusion layer is disposed between and in physical contact with the tritium absorption layer and the epitaxial semiconductor layer; wherein the Schottky contact layer is disposed on top of and in physical contact with the second portion of the epitaxial semiconductor layer; wherein the first portion of the epitaxial semiconductor layer is adjacent to the second portion of the epitaxial semiconductor layer, such that the Schottky contact region is disposed adjacent to the tritium detection region on the epitaxial semiconductor layer; and wherein the Ohmic contact layer is disposed below and in physical contact with the semiconductor layer, such that the semiconductor layer is disposed between and in physical contact with the epitaxial semiconductor layer and the Ohmic contact layer.

In some examples, the tritium absorption layer comprises a metal selected from the group consisting of Y, Ni, Ti, Pt, Pd, Mg, Li, Na, Al, Zn, Mn, Ca, Fe, Ba, La, Sn, Cu, Co, Ru, Ir, Se, carbon nanotubes, or a combination thereof. In some examples, the tritium absorption layer comprises a metal selected from the group consisting of Y, Ni, Ti, Pt, Pd, Mg, Al, Zn, Mn, Ca, Na, Fe, Ba, carbon nanotubes, or a combination thereof. In some examples, the tritium absorption layer comprises a metal selected from the group consisting of Y, Ni, Ti, or a combination thereof. In some examples, the tritium absorption layer comprises Y. In some examples, the tritium absorption layer has an average thickness of from 10 nanometers (nm) to micrometers (μm).

In some examples, the anti-diffusion layer comprises an oxide, a nitride, or a combination thereof. In some examples, the anti-diffusion layer comprises an oxide. In some examples, the anti-diffusion layer comprises a metal oxide. In some examples, the anti-diffusion layer comprises NiO, $SiO_2$, $Al_2O_3$, $Si_3N_4$, $Ta_2O_5$, or a combination thereof. In some examples, the anti-diffusion layer has an average thickness of from 1 nm to 1000 nm.

In some examples, the Schottky contact layer comprises a metal selected from the group consisting of Au, Pt, Pd, Ni, Mo, Cr, W, Zr, Pb, Ag, Al, Ti, Bi, or a combination thereof. In some examples, the Schottky contact layer comprises a metal selected from the group consisting of Au, Pt, Pd, or a combination thereof. In some examples, the Schottky contact layer has an average thickness of from 10 nm to 20 μm. In some examples, the Schottky contact layer is in physical contact with at least a portion of the anti-diffusion layer. In some examples, the Schottky contact layer is not in physical contact with the tritium absorption layer.

In some examples, the semiconductor comprises Si, Ge, SiC, GaN, AlN, AlGaN, BN, GaAs, GaSb, AlP, GaP, AlGaP, InP, ZnO, ZnTe, Cadmium Telluride (CT), Cadmium Zinc Telluride (CZT), CdS, diamond, $Ga_2O_3$, metal halide perovskite, or a combinations thereof. In some examples, the semiconductor comprises SiC or GaN. In some examples, the semiconductor layer has an average thickness of from 50 nm to 500 μm. In some examples, the epitaxial semiconductor layer has an average thickness of from 10 nm to 100 μm.

In some examples, the Ohmic contact layer comprises Ni, Au, Ag, Ti, Al, Pt, Pd, Bi, Al, Al—Si, $TiSi_2$, TiN, W, $MoSi_2$, PtSi, $CoSi_2$, $WSi_2$, In, AuGa, AuSb, Mo, $InSnO_2$, or a combination thereof. In some examples, the Ohmic contact layer comprises Ni, Au, or a combination thereof. In some examples, the Ohmic contact layer has an average thickness of from 10 nm to 20 μm.

In some examples, the device further comprise a hydrogen detection region comprising a hydrogen absorption and dissociation layer, wherein the hydrogen absorption and dissociation layer is disposed on top of and in physical contact with the epitaxial semiconductor layer, such that the hydrogen detection region covers a third portion of the epitaxial semiconductor layer. In some examples, the hydrogen detection region is not in physical contact with the tritium detection region. In some examples, the hydrogen detection region is not in physical contact with the Schottky contact region. In some examples, the hydrogen absorption and dissociation layer comprises a metal selected from the group consisting of Pt, Pd, Ni, Mn, Fe, Li, Na, Mg, Al, Ti, La, Sn, Zinc, Cu, Co, Ru, Ir, Se, or a combination thereof (such as NiMn, NiLa, etc). In some examples, the hydrogen absorption and dissociation layer comprises a metal selected from the group consisting of Pt, Pd, Ni, Fe, Sn, Zinc, Cu, Co, Ru, Ir, Se, or a combination thereof. In some examples, the hydrogen absorption and dissociation layer comprises a metal selected from the group consisting of Pt, Pd, or a combination thereof. In some examples, the hydrogen absorption and dissociation layer has an average thickness of from 10 nm to 20 μm.

In some examples, the device comprises a field effect transistor. In some examples, the device further comprises a source region and a drain region, each of the source region and the drain region independently being in contact with a portion of the semiconductor layer. In some examples, the tritium detection region comprises a gate electrode.

Also disclosed herein are methods of making any of the devices disclosed herein. The methods can, for example, comprise depositing the tritium detection region on the first portion of a top surface of the epitaxial semiconductor layer; depositing the Schottky contact layer on the second portion of the top surface of the epitaxial semiconductor layer; and depositing the Ohmic contact layer on a bottom surface of the semiconductor layer. In some examples, depositing the tritium detection region comprises depositing the anti-diffusion layer on the first portion of the top surface of the epitaxial semiconductor layer, and subsequently depositing the tritium absorption layer on the anti-diffusion layer.

In some examples, the methods further comprise depositing the hydrogen detection region on the third portion of the top surface of the epitaxial semiconductor layer, wherein depositing the hydrogen detection region comprises depositing the hydrogen absorption and dissociation layer on the third portion of the top surface of the epitaxial semiconductor layer. In some examples, depositing the Ohmic contact layer, the anti-diffusion layer, the tritium absorption layer, the Schottky contact layer, and the hydrogen absorption and dissociation layer each independently comprises electroplating, lithographic deposition, electron beam deposition, thermal deposition, spin coating, drop-casting, zone casting, dip coating, blade coating, spraying, vacuum filtration, chemical vapor deposition (CVD), atomic layer deposition (ALD), physical vapor deposition (PVD), sputtering, pulsed laser deposition, molecular beam epitaxy, evaporation, three-dimensional (3D) particle printing such as aerosol jet printing, or combinations thereof.

In some examples, the method further comprises growing the epitaxial semiconductor layer on the semiconductor layer. In some examples, growing the epitaxial semiconductor layer comprises an epitaxial growth method such as metalorganic chemical vapor deposition (MOCVD), molecular beam epitaxy (MBE), pulsed laser deposition (PLD), Hydride Vapor Phase Epitaxy (HVPE), melt growth, or a combination thereof.

Also disclosed herein are methods of use of any of the devices disclosed herein. The methods can, for example, comprise: exposing the tritium detection region of the device to an environment having an atmosphere comprising tritium, hydrogen, or a combination thereof, such that the atmosphere contacts the tritium detection region and generates a first electromagnetic signal; measuring the first electromagnetic signal; and processing the first electromagnetic signal to determine a first property of the atmosphere. In some examples, the first property comprises the presence of tritium in the atmosphere, the concentration of tritium in the atmosphere, or a combination thereof. In some examples, the first electromagnetic signal is generated by a beta particle produced by beta-decay of the tritium.

In some examples, the methods further comprise: exposing the hydrogen detection region of device to the environment, such that the atmosphere contacts the hydrogen detection region and generates a second electromagnetic signal; measuring the second electromagnetic signal, and processing the second electromagnetic signal to determine a second property of the atmosphere. In some examples, the second property comprises the presence of hydrogen in the atmosphere, the concentration of hydrogen in the atmosphere, or a combination thereof.

In some examples, the environment is present in a nuclear reactor site, a nuclear waste location, a fuel cycle facility, a nuclear medicine facility, a hydrogen production facility, a tritium production facility, a molten salt reactor, or a combination thereof.

Additional advantages of the disclosed devices and methods will be set forth in part in the description which follows, and in part will be obvious from the description. The advantages of the disclosed devices and methods will be realized and attained by means of the elements and combinations particularly pointed out in the appended claims. It is to be understood that both the foregoing general description and the following detailed description are exemplary and explanatory only and are not restrictive of the disclosed systems and methods, as claimed.

The details of one or more embodiments of the invention are set forth in the accompanying drawings and the description below. Other features, objects, and advantages of the invention will be apparent from the description and drawings, and from the claims.

BRIEF DESCRIPTION OF THE FIGURES

The accompanying figures, which are incorporated in and constitute a part of this specification, illustrate several aspects of the disclosure, and together with the description, serve to explain the principles of the disclosure.

DETAILED DESCRIPTION

Figure 1:
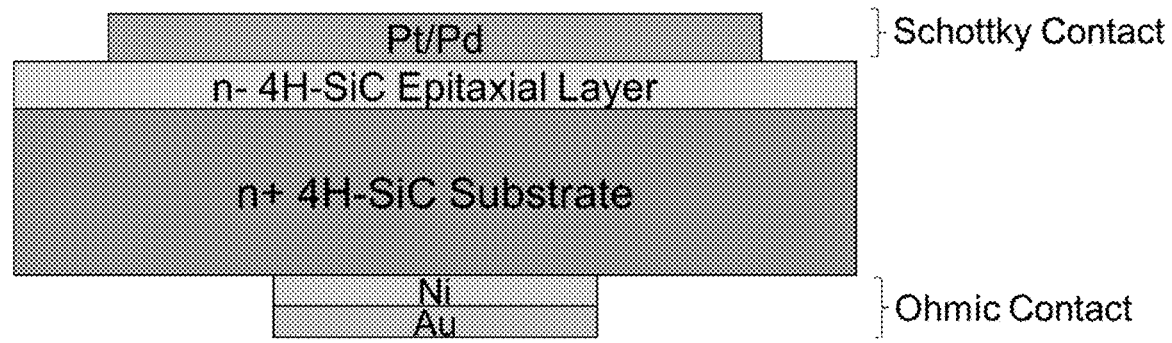
FIG. 1. Schematic cross-sectional diagram of a modern Schottky diode hydrogen sensor. This sensor design will not be able to differentiate hydrogen gas ($H_2$) and tritium gas ($^3H_2$), meaning that it is sensitive to both. Pt or Pd forms the Schottky contact and also acts as a catalytic metal for hydrogen and/or tritium gas absorption.

The devices and methods described herein may be understood more readily by reference to the following detailed description of specific aspects of the disclosed subject matter and the Examples included therein.

Before the present devices and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

In this specification and in the claims that follow, reference will be made to a number of terms, which shall be defined to have the following meanings.

Throughout the description and claims of this specification the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a composition" includes mixtures of two or more such compositions, reference to "an agent" includes mixtures of two or more such agents, reference to "the component" includes mixtures of two or more such components, and the like.

"Optional" or "optionally" means that the subsequently described event or circumstance can or cannot occur, and that the description includes instances where the event or circumstance occurs and instances where it does not.

Ranges can be expressed herein as from "about" one particular value, and/or to "about" another particular value. By "about" is meant within 5% of the value, e.g., within 4, 3, 2, or 1% of the value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

"Exemplary" means "an example of" and is not intended to convey an indication of a preferred or ideal embodiment. "Such as" is not used in a restrictive sense, but for explanatory purposes.

It is understood that throughout this specification the identifiers "first" and "second" are used solely to aid in distinguishing the various components and steps of the disclosed subject matter. The identifiers "first" and "second" are not intended to imply any particular order, amount, preference, or importance to the components or steps modified by these terms.

Disclosed herein are tritium detection devices and methods of making and use thereof. For example, disclosed herein are tritium detection devices comprising: a tritium detection region comprising a tritium absorption layer and an anti-diffusion layer; a Schottky contact region comprises a Schottky contact layer; a semiconductor layer, the semiconductor layer being a layer comprising a semiconductor; an epitaxial semiconductor layer, the epitaxial semiconductor layer being an epitaxial layer of the semiconductor; and an Ohmic contact layer; wherein the epitaxial semiconductor layer is disposed on top of and in physical contact with the semiconductor layer; wherein the tritium detection region covers a first portion of the epitaxial semiconductor layer and the Schottky contact region covers a second portion of the epitaxial semiconductor layer; wherein the anti-diffusion layer is disposed on top of and in physical contact with the first portion of the epitaxial semiconductor layer; wherein the tritium absorption layer is disposed on top of and in physical contact with the anti-diffusion layer, such that the anti-diffusion layer is disposed between and in physical contact with the tritium absorption layer and the epitaxial semiconductor layer; wherein the Schottky contact layer is disposed on top of and in physical contact with the second portion of the epitaxial semiconductor layer; wherein the first portion of the epitaxial semiconductor layer is adjacent to the second portion of the epitaxial semiconductor layer, such that the Schottky contact region is disposed adjacent to the tritium detection region on the epitaxial semiconductor layer; and wherein the Ohmic contact layer is disposed below and in physical contact with the semiconductor layer, such that the semiconductor layer is disposed between and in physical contact with the epitaxial semiconductor layer and the Ohmic contact layer.

The tritium absorption layer can comprise any material capable of absorbing tritium. In some examples, the tritium absorption layer comprises a metal selected from the group consisting of Y, Ni, Ti, Pt, Pd, Mg, Li, Na, Al, Zn, Mn, Ca, Fe, Ba, La, Sn, Cu, Co, Ru, Ir, Se, carbon nanotubes, or a combination thereof. In some examples, the tritium absorption layer comprises a metal selected from the group consisting of Y, Ni, Ti, Pt, Pd, Mg, Al, Zn, Mn, Ca, Na, Fe, Ba, carbon nanotubes, or a combination thereof. In some examples, the tritium absorption layer comprises a metal selected from the group consisting of Y, Ni, Ti, or a combination thereof. In some examples, the tritium absorption layer comprises Y.

The tritium absorption layer can, for example, have an average thickness of 10 nanometers (nm) or more (e.g., 15 nm or more, 20 nm or more, 25 nm or more, 30 nm or more, nm or more, 40 nm or more, 45 nm or more, 50 nm or more, 60 nm or more, 70 nm or more, nm or more, 90 nm or more, 100 nm or more, 125 nm or more, 150 nm or more, 175 nm or more, 200 nm or more, 225 nm or more, 250 nm or more, 300 nm or more, 350 nm or more, 400 nm or more, 450 nm or more, 500 nm or more, 600 nm or more, 700 nm or more, 800 nm or more, 900 nm or more, 1 micrometer (µm, micron) or more, 1.25 µm or more, 1.5 µm or more, 1.75 µm or more, 2 µm or more, 2.25 µm or more, 2.5 µm or more, 3 µm or more, 3.5 µm or more, 4 µm or more, 4.5 µm or more, 5 µm or more, 6 µm or more, 7 µm or more, 8 µm or more, 9 µm or more, 10 µm or more, 11 µm or more, 12 µm or more, 13 µm or more, 14 µm or more, 15 µm or more, 16 µm or more, 17 µm or more, 18 µm or more, or 19 µm or more). In some examples, the tritium absorption layer can have an average thickness to 20 micrometers (µm, microns) or less (e.g., 19 µm or less, 18 µm or less, 17 µm or less, 16 µm or less, 15 µm or less, 14 µm or less, 13 µm or less, 12 µm or less, 11 µm or less, 10 µm or less, 9 µm or less, 8 µm or less, 7 µm or less, 6 µm or less, 5 µm or less, 4.5 µm or less, 4 µm or less, 3.5 µm or less, 3 µm or less, 2.5 µm or less, 2.25 µm or less, 2 µm or less, 1.75 µm or less, 1.5 µm or less, 1.25 µm or less, 1 µm or less, 900 nm or less, 800 nm or less, 700 nm or less, 600 nm or less, 500 nm or less, 450 nm or less, 400 nm or less, 350 nm or less, 300 nm or less, 250 nm or less, 225 nm or less, 200 nm or less, 175 nm or less, 150 nm or less, 125 nm or less, 100 nm or less, 90 nm or less, 80 nm or less, 70 nm or less, 60 nm or less, 50 nm or less, 45 nm or less, 40 nm or less, 35 nm or less, 30 nm or less, 25 nm or less, 20 nm or less, or 15 nm or less). The average thickness of the tritium absorption layer can range from any of the minimum values described above to any of the maximum values described above. For example, the tritium absorption layer can have an average thickness of from 10 nm to 20 µm (e.g., from 10 nm to 750 nm, from 750 nm to 20 µm, from 10 nm to 100 nm, from 100 nm to 1 µm, from 1 µm to 20 µm, from 10 nm to 15 µm, from 10 nm to 10 µm, from 10 nm to 5 µm, from 10 nm to 1 µm, from 10 nm to 750 nm, from 10 nm to 500 nm, from 10 nm to 250 nm, from 25 nm to 20 µm, from 50 nm to 20 µm, from 75 nm to 20 µm, from 100 nm to 20 µm, from 250 nm to 20 µm, from 500 nm to 20 µm, from 750 nm to 20 µm, from 1 µm to 20 µm, from 5 µm to 20 µm, from 10 µm to 20 µm, from 25 nm to 15 µm, from 50 nm to 10 µm, from 75 nm to 5 µm, or from 100 nm to 1 µm). The average thickness of the tritium absorption layer can be measured using methods known in the art, such as, for example, atomic force microscopy or electron microscopy.

The anti-diffusion layer can comprise any material capable of preventing diffusion of atoms (e.g., hydrogen, tritium, helium, etc.) from entering the epitaxial semiconductor layer. In some examples, the anti-diffusion layer comprises an oxide, a nitride, or a combination thereof. In some examples, the anti-diffusion layer comprises an oxide, such as a metal oxide. In some examples, the anti-diffusion layer comprises NiO, $SiO_2$, $Al_2O_3$, $Si_3N_4$, $Ta_2O_5$, or a combination thereof.

The anti-diffusion layer can, for example, have an average thickness of 1 nm or more (e.g., 2 nm or more, 3 nm or more, 4 nm or more, 5 nm or more, 6 nm or more, 7 nm or more, 8 nm or more, 9 nm or more, 10 nm or more, 15 nm or more, 20 nm or more, 25 nm or more, 30 nm or more, 35 nm or more, 40 nm or more, 45 nm or more, 50 nm or more, 60 nm or more, 70 nm or more, 80 nm or more, 90 nm or more, 100 nm or more, 125 nm or more, 150 nm or more, 175 nm or more, 200 nm or more, 225 nm or more, 250 nm or more, 275 nm or more, 300 nm or more, 350 nm or more, 400 nm or more, 450 nm or more, 500 nm or more, 550 nm or more, 600 nm or more, 650 nm or more, 700 nm or more, 750 nm or more, 800 nm or more, 850 nm or more, 900 nm or more, or 950 nm or more). In some examples, the anti-diffusion layer can have an average thickness of 1000 nm or less (e.g., 950 nm or less, 900 nm or less, 750 nm or less, 800 nm or less, 750 nm or less, 700 nm or less, 650 nm or less, 600 nm or less, 550 nm or less, 500 nm or less, 450 nm or less, 400 nm or less, 350 nm or less, 300 nm or less, 275 nm or less, 250 nm or less, 225 nm or less, 200 nm or less, 175 nm or less, 150 nm or less, 125 nm or less, 100 nm or less, 90 nm or less, 80 nm or less, 70 nm or less, 60 nm or less, 50 nm or less, 45 nm or less, 40 nm or less, 35 nm or less, 30 nm or less, 25 nm or less, 20 nm or less, 15 nm or less, nm or less, 9 nm or less, 8 nm or less, 7 nm or less, 6 nm or less, 5 nm or less, 4 nm or less, 3 nm or less, or 2 nm or less). The average thickness of the anti-diffusion layer can range from any of the minimum values described above to any of the maximum values described above. For example, the anti-diffusion layer can have an average thickness of from 1 nm to 1000 nm (e.g., from 1 nm to 500 nm, from 500 nm to 1000 nm, from 1 nm to 200 nm, from 200 nm to 400 nm, from 400 nm to 600 nm, from 600 nm to 800 nm, from 800 nm to 1000 nm, from 1 nm to 900 nm, from 1 nm to 800 nm, from 1 nm to 700 nm, from 1 nm to 600 nm, from 1 nm to 500 nm, from 1 nm to 400 nm, from 1 nm to 300 nm, from 1 nm to 200 nm, from 1 nm to 100 nm, from 1 nm to 50 nm, from 1 nm to 25 nm, from 1 nm to 10 nm, from 10 nm to 1000 nm, from 25 nm to 1000 nm, from 50 nm to 1000 nm, from 100 nm to 1000 nm, from 200 nm to 1000 nm, from 300 nm to 1000 nm, from 400 nm to 1000 nm, from 500 nm to 1000 nm, from 600 nm to 1000 nm, from 700 nm to 1000 nm, from 800 nm to 1000 nm, from 900 nm to 1000 nm, from 5 nm to 950 nm, from 10 nm to 900 nm, from 25 nm to 750 nm, or from 50 nm to 500 nm). The average thickness of the anti-diffusion layer can be measured using methods known in the art, such as, for example, atomic force microscopy or electron microscopy.

The Schottky contact layer can comprise any material capable of forming a Schottky contact with the semiconductor. In some examples, the Schottky contact layer comprises a metal selected from the group consisting of Au, Pt, Pd, Ni, Mo, Cr, W, Zr, Pb, Ag, Al, Ti, Bi, or a combination thereof. In some examples, the Schottky contact layer comprises a metal selected from the group consisting of Au, Pt, Pd, or a combination thereof.

The Schottky contact layer can, for example, have an average thickness of 10 nanometers (nm) or more (e.g., 15 nm or more, 20 nm or more, 25 nm or more, 30 nm or more, 35 nm or more, 40 nm or more, 45 nm or more, 50 nm or more, 60 nm or more, 70 nm or more, 80 nm or more, 90 nm or more, 100 nm or more, 125 nm or more, 150 nm or more, 175 nm or more, 200 nm or more, 225 nm or more, 250 nm or more, 300 nm or more, 350 nm or more, 400 nm or more, 450 nm or more, 500 nm or more, 600 nm or more, 700 nm or more, 800 nm or more, 900 nm or more, 1 micrometer (μm, micron) or more, 1.25 μm or more, 1.5 μm or more, 1.75 μm or more, 2 μm or more, 2.25 μm or more, 2.5 μm or more, 3 μm or more, 3.5 μm or more, 4 μm or more, 4.5 μm or more, 5 μm or more, 6 μm or more, 7 μm or more, 8 μm or more, 9 μm or more, 10 μm or more, 11 μm or more, 12 μm or more, 13 μm or more, 14 μm or more, 15 μm or more, 16 μm or more, 17 μm or more, 18 μm or more, or 19 μm or more). In some examples, the Schottky contact layer can have an average thickness to 20 micrometers (μm, microns) or less (e.g., 19 μm or less, 18 μm or less, 17 μm or less, 16 μm or less, 15 μm or less, 14 μm or less, 13 μm or less, 12 μm or less, 11 μm or less, 10 μm or less, 9 μm or less, 8 μm or less, 7 μm or less, 6 μm or less, 5 μm or less, 4.5 μm or less, 4 μm or less, 3.5 μm or less, 3 μm or less, 2.5 μm or less, 2.25 μm or less, 2 μm or less, 1.75 μm or less, 1.5 μm or less, 1.25 μm or less, 1 μm or less, 900 nm or less, 800 nm or less, 700 nm or less, 600 nm or less, 500 nm or less, 450 nm or less, 400 nm or less, 350 nm or less, 300 nm or less, 250 nm or less, 225 nm or less, 200 nm or less, 175 nm or less, 150 nm or less, 125 nm or less, 100 nm or less, 90 nm or less, 80 nm or less, 70 nm or less, 60 nm or less, 50 nm or less, 45 nm or less, 40 nm or less, 35 nm or less, 30 nm or less, 25 nm or less, 20 nm or less, or 15 nm or less). The average thickness of the Schottky contact layer can range from any of the minimum values described above to any of the maximum values described above. For example, the Schottky contact layer can have an average thickness of from 10 nm to 20 μm (e.g., from 10 nm to 750 nm, from 750 nm to 20 μm, from 10 nm to 100 nm, from 100 nm to 1 μm, from 1 μm to 20 μm, from 10 nm to 15 μm, from 10 nm to μm, from 10 nm to 5 μm, from 10 nm to 1 μm, from 10 nm to 750 nm, from 10 nm to 500 nm, from 10 nm to 250 nm, from 25 nm to 20 μm, from 50 nm to 20 μm, from 75 nm to 20 μm, from 100 nm to 20 μm, from 250 nm to 20 μm, from 500 nm to 20 μm, from 750 nm to 20 μm, from 1 μm to 20 μm, from 5 μm to 20 μm, from 10 nm to 20 μm, from 25 nm to 15 μm, from 50 nm to 10 μm, from 75 nm to 5 μm, or from 100 nm to 1 μm). The average thickness of the Schottky contact layer can be measured using methods known in the art, such as, for example, atomic force microscopy or electron microscopy.

The semiconductor can comprise any suitable semiconductor material. Examples of semiconductors include, but are not limited to, Si, Ge, SiC, GaN, AlN, AlGaN, BN, GaAs, GaSb, AlP, GaP, AlGaP, InP, ZnO, ZnTe, Cadmium Telluride (CT), Cadmium Zinc Telluride (CZT), CdS, diamond, $Ga_2O_3$, metal halide perovskite, and combinations thereof. In some examples, the semiconductor can comprise SiC or GaN.

In some examples, the semiconductor layer can have an average thickness of 50 nm or more (e.g., 55 nm or more, 60 nm or more, 65 nm or more, 70 nm or more, 75 nm or more, 80 nm or more, 85 nm or more, 90 nm or more, 95 nm or more, 100 nm or more, 110 nm or more, 120 nm or more, 130 nm or more, 140 nm or more, 150 nm or more, 175 nm or more, 200 nm or more, 225 nm or more, 250 nm or more, 275 nm or more, 300 nm or more, 350 nm or more, 400 nm or more, 450 nm or more, 500 nm or more, 600 nm or more, 700 nm or more, 800 nm or more, 900 nm or more, 1 micrometer (μm, micron) or more, 1.25 μm or more, 1.5 μm or more, 1.75 μm or more, 2 μm or more, 2.25 μm or more, 2.5 μm or more, 3 μm or more, 3.5 μm or more, 4 μm or more, 4.5 μm or more, 5 μm or more, 6 μm or more, 7 μm or more, 8 μm or more, 9 μm or more, 10 μm or more, 15 μm or more, 20 μm or more, 25 μm or more, 30 μm or more, 35 μm or more, 40 μm or more, 45 μm or more, 50 μm or more, 60 μm or more, 70 μm or more, 80 μm or more, 90 μm or more, 100 μm or more, 125 μm or more, 150 μm or more, 175 μm or more, 200 μm or more, 225 μm or more, 250 μm or more, 300 μm or more, 350 μm or more, 400 μm or more, or 450 μm or more). In some examples, the semiconductor layer can have an average thickness of 500 μm or less (e.g., 450 μm or less, 400 μm or less, 350 μm or less, 300 μm or less, 250 μm or less, 225 μm or less, 200 μm or less, 175 μm or less, 150 μm or less, 125 μm or less, 100 μm or less, 90 μm or less, 80 μm or less, 70 μm or less, 60 μm or less, μm or less, 45 μm or less, 40 μm or less, 35 μm or less, 30 μm or less, 25 μm or less, 20 μm or less, 15 μm or less, 10 μm or less, 9 μm or less, 8 μm or less, 7 μm or less, 6 μm or less, 5 μm or less, 4.5 μm or less, 4 μm or less, 3.5 μm or less, 3 μm or less, 2.5 μm or less, 2.25 μm or less, 2 μm or less, 1.75 μm or less, 1.5 μm or less, 1.25 μm or less, 1 μm or less, 900 nm or less, 800 nm or less, 700 nm or less, 600 nm or less, 500 nm or less, 450 nm or less, 400 nm or less, 350 nm or less, 300 nm or less, 250 nm or less, 225 nm or less, 200 nm or less, 175 nm or less, 150 nm or less, 140 nm or less, 130 nm or less, 120 nm or less, 110 nm or less, 100 nm or less, nm or less, 90 nm or less, 85 nm or less, 80 nm or less, 75 nm or less, 70 nm or less, 65 nm or less, 60 nm or less, or 55 nm or less). The average thickness of the semiconductor layer can range from any of the minimum values described above to any of the maximum values described above. For example, the semiconductor layer can have an average thickness of from 50 nm to 500 μm (e.g., from 50 nm to 1 μm, from 1 μm to 50 μm, from 50 nm to 500 nm, from 500 nm to μm, from 5 μm to 50 μm, from 50 nm to 40 μm, from 50 nm to 30 μm, from 50 nm to 25 μm, from 50 nm to 20 μm, from 50 nm to 15 μm, from 50 nm to 10 μm, from 50 nm to 5 μm, from nm to 1 μm, from 50 nm to 750 nm, from 50 nm to 500 nm, from 50 nm to 250 nm, from 50 nm to 175 nm, from 50 nm to 100 nm, from 75 nm to 50 μm, from 100 nm to 50 μm, from 175 nm to 50 μm, from 250 nm to 50 μm, from 500 nm to 50 μm, from 750 nm to 50 μm, from 1 μm to 50 μm, from 5 μm to 50 μm, from 10 μm to 50 μm, from 15 μm to 50 μm, from 20 μm to 50 μm, from 25 μm to 50 μm, from 60 nm to 40 μm, from 75 nm to 25 μm, or from 100 nm to 10 μm). The average thickness of the semiconductor layer can be measured using methods known in the art, such as, for example, atomic force microscopy or electron microscopy.

The epitaxial semiconductor layer can, for example, have an average thickness of 10 nm or more (e.g., 15 nm or more, 20 nm or more, 25 nm or more, 30 nm or more, 35 nm or more, 40 nm or more, 45 nm or more, 50 nm or more, 60 nm or more, 70 nm or more, 80 nm or more, 90 nm or more, 100 nm or more, 125 nm or more, 150 nm or more, 175 nm or more, 200 nm or more, 225 nm or more, 250 nm or more, 300 nm or more, 350 nm or more, 400 nm or more, 450 nm or more, 500 nm or more, 600 nm or more, 700 nm or more, 800 nm or more, 900 nm or more, 1 micrometer (μm, micron) or more, 1.25 μm or more, 1.5 μm or more, 1.75 μm or more, 2 μm or more, 2.25 μm or more, 2.5 μm or more, 3 μm or more, 3.5 μm or more, 4 μm or more, 4.5 μm or more, 5 μm or more, 6 μm or more, 7 μm or more, 8 μm or more, or 9 μm or more). In some examples, the epitaxial semiconductor layer can have an average thickness to 10 micrometers (µm, microns) or less (e.g., 9 µm or less, 8 µm or less, 7 µm or less, 6 µm or less, 5 µm or less, 4.5 µm or less, 4 µm or less, 3.5 µm or less, 3 µm or less, 2.5 µm or less, 2.25 µm or less, 2 µm or less, 1.75 µm or less, 1.5 µm or less, 1.25 µm or less, 1 µm or less, 900 nm or less, 800 nm or less, 700 nm or less, 600 nm or less, 500 nm or less, 450 nm or less, 400 nm or less, 350 nm or less, 300 nm or less, 250 nm or less, 225 nm or less, 200 nm or less, 175 nm or less, 150 nm or less, 125 nm or less, 100 nm or less, 90 nm or less, 80 nm or less, 70 nm or less, 60 nm or less, 50 nm or less, 45 nm or less, 40 nm or less, 35 nm or less, 30 nm or less, 25 nm or less, 20 nm or less, or 15 nm or less). The average thickness of the epitaxial semiconductor layer can range from any of the minimum values described above to any of the maximum values described above. For example, the epitaxial semiconductor layer can have an average thickness of from 10 nm to 10 µm (e.g., from 10 nm to 500 nm, from 500 nm to 10 µm, from 10 nm to 100 nm, from 100 nm to 1 µm, from 1 µm to 10 µm, from 10 nm to 5 µm, from 10 nm to 1 µm, from nm to 750 nm, from 10 nm to 500 nm, from 10 nm to 250 nm, from 25 nm to 10 µm, from 50 nm to 10 µm, from 75 nm to 10 µm, from 100 nm to 10 µm, from 250 nm to 10 µm, from 500 nm to 10 µm, from 750 nm to 10 µm, from 1 µm to 10 µm, from 5 µm to 10 µm, from 25 nm to µm, or from 50 nm to 1 µm). The average thickness of the epitaxial semiconductor layer can be measured using methods known in the art, such as, for example, atomic force microscopy or electron microscopy.

The Ohmic contact layer can comprise any material capable of forming an Ohmic contact with the semiconductor. In some examples, the Ohmic contact layer comprises Ni, Au, Ag, Ti, Al, Pt, Pd, Bi, Al, Al—Si, TiSi$_2$, TiN, W, MoSi$_2$, PtSi, CoSi$_2$, WSi$_2$, In, AuGa, AuSb, Mo, InSnO$_2$, or a combination thereof. In some examples, the Ohmic contact layer comprises Ni, Au, or a combination thereof.

The Ohmic contact layer can, for example, have an average thickness of 10 nanometers (nm) or more (e.g., 15 nm or more, 20 nm or more, 25 nm or more, 30 nm or more, 35 nm or more, 40 nm or more, 45 nm or more, 50 nm or more, 60 nm or more, 70 nm or more, 80 nm or more, 90 nm or more, 100 nm or more, 125 nm or more, 150 nm or more, 175 nm or more, 200 nm or more, 225 nm or more, 250 nm or more, 300 nm or more, 350 nm or more, 400 nm or more, 450 nm or more, 500 nm or more, 600 nm or more, 700 nm or more, 800 nm or more, 900 nm or more, 1 micrometer (µm, micron) or more, 1.25 µm or more, 1.5 µm or more, 1.75 µm or more, 2 µm or more, 2.25 µm or more, 2.5 µm or more, 3 µm or more, 3.5 µm or more, 4 µm or more, 4.5 µm or more, 5 µm or more, 6 µm or more, 7 µm or more, 8 µm or more, 9 µm or more, 10 µm or more, 11 µm or more, 12 µm or more, 13 µm or more, 14 µm or more, 15 µm or more, 16 µm or more, 17 µm or more, 18 µm or more, or 19 µm or more). In some examples, the Ohmic contact layer can have an average thickness to 20 micrometers (µm, microns) or less (e.g., 19 µm or less, 18 µm or less, 17 µm or less, 16 µm or less, 15 µm or less, 14 µm or less, 13 µm or less, 12 µm or less, 11 µm or less, 10 µm or less, 9 µm or less, 8 µm or less, 7 µm or less, 6 µm or less, 5 µm or less, 4.5 µm or less, 4 µm or less, 3.5 µm or less, 3 µm or less, 2.5 µm or less, 2.25 µm or less, 2 µm or less, 1.75 µm or less, 1.5 µm or less, 1.25 µm or less, 1 µm or less, 900 nm or less, 800 nm or less, 700 nm or less, 600 nm or less, 500 nm or less, 450 nm or less, 400 nm or less, 350 nm or less, 300 nm or less, 250 nm or less, 225 nm or less, 200 nm or less, 175 nm or less, 150 nm or less, 125 nm or less, 100 nm or less, 90 nm or less, 80 nm or less, 70 nm or less, 60 nm or less, 50 nm or less, 45 nm or less, 40 nm or less, 35 nm or less, 30 nm or less, 25 nm or less, 20 nm or less, or 15 nm or less). The average thickness of the Ohmic contact layer can range from any of the minimum values described above to any of the maximum values described above. For example, the Ohmic contact layer can have an average thickness of from 10 nm to 20 µm (e.g., from 10 nm to 750 nm, from 750 nm to 20 µm, from 10 nm to 100 nm, from 100 nm to 1 µm, from 1 µm to 20 µm, from 10 nm to 15 µm, from 10 nm to 10 µm, from 10 nm to 5 µm, from 10 nm to 1 µm, from 10 nm to 750 nm, from 10 nm to 500 nm, from 10 nm to 250 nm, from 25 nm to 20 µm, from 50 nm to 20 µm, from 75 nm to 20 µm, from 100 nm to 20 µm, from 250 nm to 20 µm, from 500 nm to 20 µm, from 750 nm to 20 µm, from 1 µm to 20 µm, from 5 µm to 20 µm, from 10 µm to 20 µm, from 25 nm to 15 µm, from 50 nm to 10 µm, from nm to 5 µm, or from 100 nm to 1 µm). The average thickness of the Ohmic contact layer can be measured using methods known in the art, such as, for example, atomic force microscopy or electron microscopy.

Figure 5:
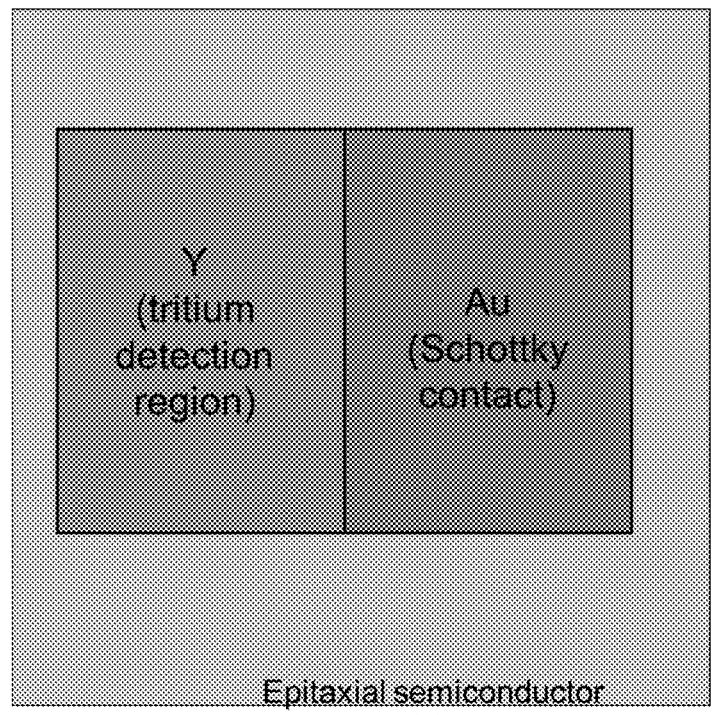
FIG. 5. Top down view of an example device as disclosed herein wherein the tritium detection region and the Schottky contact region can each be substantially rectangular in shape.
Figure 6:
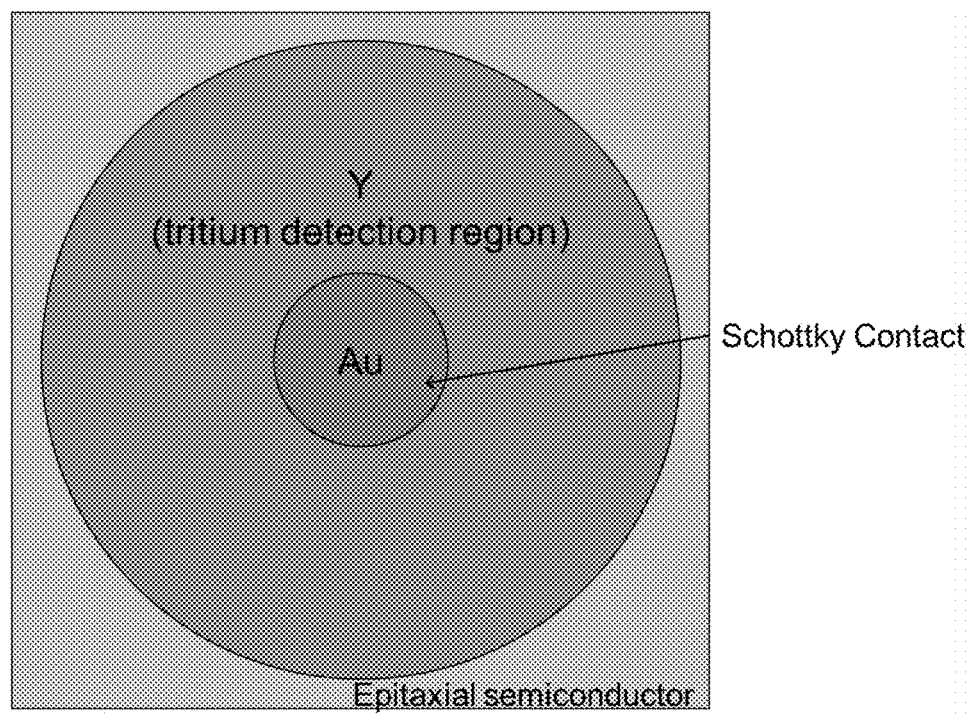
FIG. 6. Top down view of an example device as disclosed herein wherein the tritium detection region can be annular in shape and the Schottky contact region is disposed in the center of the annular shape.

The Schottky contact region and the tritium detection region can have any suitable shape. In some examples, the tritium detection region and the Schottky contact region can each be substantially rectangular in shape, as shown in FIG. 5. In some examples, the tritium detection region can be annular in shape and the Schottky contact region can be disposed in the center of the annular shape, for example as shown in FIG. 6.

In some examples, the Schottky contact layer is in physical contact with at least a portion of the anti-diffusion layer. In some examples, the Schottky contact layer is not in physical contact with the tritium absorption layer. In some examples, the devices can further comprise a hydrogen detection region comprising a hydrogen absorption and dissociation layer, wherein the hydrogen absorption and dissociation layer is disposed on top of and in physical contact with the epitaxial semiconductor layer, such that the hydrogen detection region covers a third portion of the epitaxial semiconductor layer. In some examples, the hydrogen detection region is not in physical contact with the tritium detection region and/or the Schottky contact region.

The hydrogen absorption and dissociation layer can comprise any material capable of absorbing and dissociating diatomic hydrogen. In some examples, the hydrogen absorption and dissociation layer comprises a metal selected from the group consisting of Pt, Pd, Ni, Mn, Fe, Li, Na, Mg, Al, Ti, La, Sn, Zinc, Cu, Co, Ru, Ir, Se, or a combination thereof (such as NiMn, NiLa, etc). In some examples, the hydrogen absorption and dissociation layer comprises a metal selected from the group consisting of Pt, Pd, Ni, Fe, Sn, Zinc, Cu, Co, Ru, Ir, Se, or a combination thereof. In some examples, the hydrogen absorption and dissociation layer comprises a metal selected from the group consisting of Pt, Pd, or a combination thereof.

The hydrogen absorption and dissociation layer can, for example, have an average thickness of 10 nanometers (nm) or more (e.g., 15 nm or more, 20 nm or more, 25 nm or more, nm or more, 35 nm or more, 40 nm or more, 45 nm or more, 50 nm or more, 60 nm or more, 70 nm or more, 80 nm or more, 90 nm or more, 100 nm or more, 125 nm or more, 150 nm or more, 175 nm or more, 200 nm or more, 225 nm or more, 250 nm or more, 300 nm or more, 350 nm or more, 400 nm or more, 450 nm or more, 500 nm or more, 600 nm or more, 700 nm or more, 800 nm or more, 900 nm or more, 1 micrometer (µm, micron) or more, 1.25 µm or more, 1.5 µm or more, 1.75 µm or more, 2 µm or more, 2.25 µm or more, 2.5 µm or more, 3 µm or more, 3.5 µm or more, 4 µm or more, 4.5 µm or more, 5 µm or more, 6 µm or more, 7 µm or more, 8 µm or more, 9 µm or more, 10 µm or more, 11 µm or more, 12 µm or more, 13 µm or more, 14 µm or more, 15 µm or more, 16 µm or more, 17 µm or more, 18 µm or more, or 19 µm or more). In some examples, the hydrogen absorption and dissociation layer can have an average thickness to 20 micrometers (µm, microns) or less (e.g., 19 µm or less, 18 µm or less, 17 µm or less, 16 µm or less, 15 µm or less, 14 µm or less, 13 µm or less, 12 µm or less, 11 µm or less, 10 µm or less, 9 µm or less, 8 µm or less, 7 µm or less, 6 µm or less, 5 µm or less, 4.5 µm or less, 4 µm or less, 3.5 µm or less, 3 µm or less, 2.5 µm or less, 2.25 µm or less, 2 µm or less, 1.75 µm or less, 1.5 µm or less, 1.25 µm or less, 1 µm or less, 900 nm or less, 800 nm or less, 700 nm or less, 600 nm or less, 500 nm or less, 450 nm or less, 400 nm or less, 350 nm or less, 300 nm or less, 250 nm or less, 225 nm or less, 200 nm or less, 175 nm or less, 150 nm or less, 125 nm or less, 100 nm or less, 90 nm or less, 80 nm or less, 70 nm or less, 60 nm or less, 50 nm or less, 45 nm or less, 40 nm or less, 35 nm or less, 30 nm or less, 25 nm or less, 20 nm or less, or 15 nm or less). The average thickness of the hydrogen absorption and dissociation layer can range from any of the minimum values described above to any of the maximum values described above. For example, the hydrogen absorption and dissociation layer can have an average thickness of from nm to 20 µm (e.g., from 10 nm to 750 nm, from 750 nm to 20 µm, from 10 nm to 100 nm, from 100 nm to 1 µm, from 1 µm to 20 µm, from 10 nm to 15 µm, from 10 nm to 10 µm, from nm to 5 µm, from 10 nm to 1 µm, from 10 nm to 750 nm, from 10 nm to 500 nm, from 10 nm to 250 nm, from 25 nm to 20 µm, from 50 nm to 20 µm, from 75 nm to 20 µm, from 100 nm to µm, from 250 nm to 20 µm, from 500 nm to 20 µm, from 750 nm to 20 µm, from 1 µm to 20 µm, from 5 µm to 20 µm, from 10 µm to 20 µm, from 25 nm to 15 µm, from 50 nm to 10 µm, from 75 nm to 5 µm, or from 100 nm to 1 µm). The average thickness of the hydrogen absorption and dissociation layer can be measured using methods known in the art, such as, for example, atomic force microscopy or electron microscopy.

In some examples, the device can comprise a field effect transistor. For example, the device can further comprise a source region and a drain region, each of the source region and the drain region independently being in contact with a portion of the semiconductor layer. In some examples, the tritium detection region comprises a gate electrode.

Also disclosed herein are methods of making any of the devices disclosed herein. For example, the methods can comprise depositing the tritium detection region on the first portion of a top surface of the epitaxial semiconductor layer; depositing the Schottky contact layer on the second portion of the top surface of the epitaxial semiconductor layer; and depositing the Ohmic contact layer on a bottom surface of the semiconductor layer. In some examples, depositing the tritium detection region comprises depositing the anti-diffusion layer on the first portion of the top surface of the epitaxial semiconductor layer, and subsequently depositing the tritium absorption layer on the anti-diffusion layer.

In some examples, the methods can further comprise depositing the hydrogen detection region on the third portion of the top surface of the epitaxial semiconductor layer, wherein depositing the hydrogen detection region can comprise depositing the hydrogen absorption and dissociation layer on the third portion of the top surface of the epitaxial semiconductor layer.

Depositing the Ohmic contact layer, the anti-diffusion layer, the tritium absorption layer, the Schottky contact layer, and the hydrogen absorption and dissociation layer can, for example, each independently comprise electroplating, lithographic deposition, electron beam deposition, thermal deposition, spin coating, drop-casting, zone casting, dip coating, blade coating, spraying, vacuum filtration, chemical vapor deposition (CVD), atomic layer deposition (ALD), physical vapor deposition (PVD), sputtering, pulsed laser deposition, molecular beam epitaxy, evaporation, three-dimensional (3D) particle printing such as aerosol jet printing, or combinations thereof.

In some examples, the methods can further comprise growing the epitaxial semiconductor layer on the semiconductor layer. Growing the epitaxial semiconductor layer can, for example, comprise an epitaxial growth method such as metalorganic chemical vapor deposition (MOCVD), molecular beam epitaxy (MBE), pulsed laser deposition (PLD), Hydride Vapor Phase Epitaxy (HVPE), melt growth, or a combination thereof.

Also disclosed herein are methods of use of any of the devices disclosed herein. For example, the methods can comprise: exposing the tritium detection region of the device to an environment having an atmosphere comprising tritium, hydrogen, or a combination thereof, such that the atmosphere contacts the tritium detection region and generates a first electromagnetic signal; measuring the first electromagnetic signal; and processing the first electromagnetic signal to determine a first property of the atmosphere. In some examples, the first electromagnetic signal is generated by a beta particle produced by beta-decay of the tritium. The first property can, for example, comprise the presence of tritium in the atmosphere, the concentration of tritium in the atmosphere, or a combination thereof.

In some examples, the methods can further comprise: exposing the hydrogen detection region of device to environment, such that the atmosphere contacts the hydrogen detection region and generates a second electromagnetic signal; and measuring the second electromagnetic signal, and processing the second electromagnetic signal to determine a second property of the atmosphere. The second property can, for example, comprise the presence of hydrogen in the atmosphere, the concentration of hydrogen in the atmosphere, or a combination thereof.

The environment can, for example, be present in a nuclear reactor site, a nuclear waste location, a fuel cycle facility, a nuclear medicine facility, a hydrogen production facility, a tritium production facility, a molten salt reactor, or a combination thereof.

A number of embodiments of the invention have been described. Nevertheless, it will be understood that various modifications may be made without departing from the spirit and scope of the invention. Accordingly, other embodiments are within the scope of the following claims.

The examples below are intended to further illustrate certain aspects of the systems and methods described herein, and are not intended to limit the scope of the claims.

EXAMPLES

The following examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations of the present invention which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of measurement conditions, e.g., component concentrations, temperatures, pressures and other measurement ranges and conditions that can be used to optimize the described process.

Example 1—a Tritium-Hydrogen Differentiating Sensor

Introduction/Background: Tritium is an isotope of hydrogen ($H_2$) that emits fast electrons (beta particles) with an average energy of 5.68 keV while decaying at a half-life of 12.3 years. Tritium is currently widely used as a radioactive tracer and radio luminescent light source for watches, signage on highways, airports, and hospitals. The beta particles emitted from tritium can only travel a maximum distance of 7 mm in air. They will not pass-through human skin and can be easily shielded with a piece of thin plastic. These features make the detection of tritium extremely difficult.

The concept of using nuclear reactors to thermochemically produce $H_2$ is a large area of study on ways to utilize nuclear energy for the future. A $H_2$-based economy could dramatically reduce the use of fossil fuels and global greenhouse gas emission from energy production. Tritium is produced as a significant by-product in nuclear reactor systems, including light water reactors, non-light water reactors, and nuclear powered hydrogen production process. Tritium is also part of nuclear waste that exists in fuel cycle facilities and in nuclear waste disposal locations. Monitoring of tritium in secondary and ternary reactor coolants is important in order to determine the amount of radioactive material leaving the plant.

Advanced reactor designs will require instrumentation and sensors that must withstand harsh environments of high temperature, pressure, radiation field, and $H_2$ concentration. Traditional, silicon-based electronics cannot function above temperatures greater than 50° C., making silicon carbide (SiC) or other alternative wide bandgap or ultra wide bandgap semiconductor-based devices more attractive. With their larger bandgap (3.24 eV for SiC compared to 1.1 eV for Si), SiC devices can operate at much higher temperatures (~600° C.) without the need for cooling (Pearton S J et al., *Journal of Physics-Condensed Matter*, 2004, 16(29), R961-R994).

Figure 2:
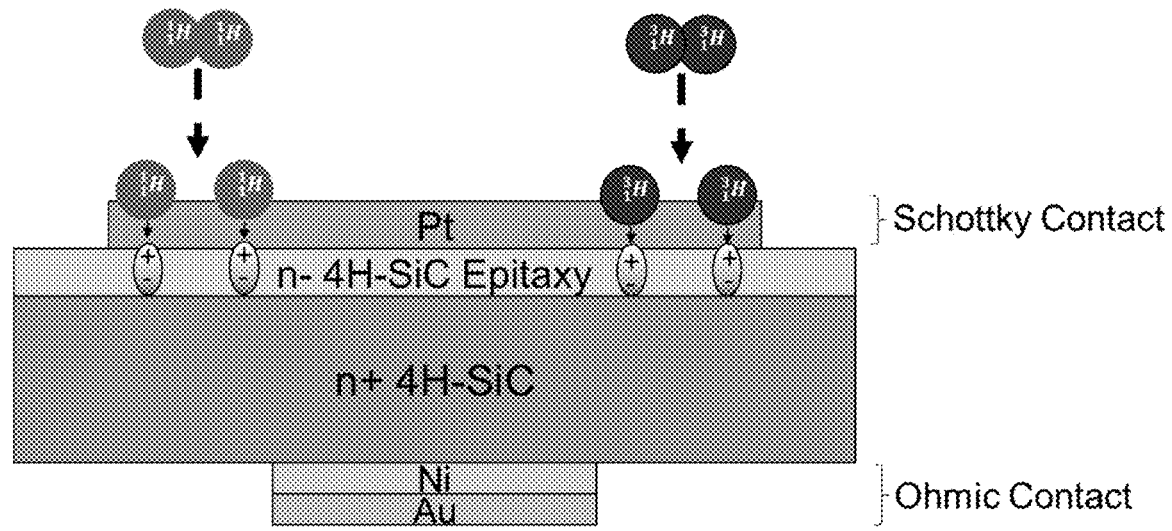
FIG. 2. Schematic cross-sectional diagram of a modern Schottky diode hydrogen sensor. This sensor will not be able to differentiate $H_2$ and $^3H_2$, meaning that it is sensitive to both. Pt or Pd forms the Schottky contact and acts as a catalyst to dissociate the hydrogen or tritium into atoms, which then permeate through the Pt or Pd and reach the metal-semiconductor interface, increasing leakage current, which is the detection signal that indicates the presence of hydrogen or tritium.

Diatomic $H_2$ can be present with both protium ($^1H$) and tritium ($^3H$) isotopes in a nuclear reactor environment. A simple $H_2$ detector is shown in FIG. 1-FIG. 2: platinum (Pt) or palladium (Pd) metal dissociates incident diatomic $H_2$ gas, and the separated hydrogen atoms drift to the SiC semiconductor epitaxial layer. Changes to the interfacial structure between metal and SiC semiconductor and Schottky barrier height cause changes in current through the device, observed through current-voltage (I-V) characteristic curves in both forward and reverse bias mode through the detector.

The change in barrier height increases with increasing temperature, indicating an increasing sensitivity of the Pt—SiC Schottky diode sensor, for example to $H_2$ gas. The $H_2$ absorption rate also increases with increasing temperature and $H_2$ concentration (Kim C K et al. *Sensors and Actuators B: Chemical*, 2000, 66(1-3), 116-118). The change in electric field across the depletion region in the device can be related to the $H_2$ concentration near the device, as the change in electrical polarization voltage is proportional to hydrogen concentration (Huang J R et al. *Ieee Sensors Journal*, 2011, 11(5), 1194-1200).

Tritium decays via Beta-minus decay in the following equation to produce helium-3, a beta particle, and an antineutrino:

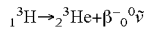

$$_1^3H \rightarrow {_2^3}He + \beta^-_0 + {_0^0}\bar{\nu}$$

The electron emitted has an average energy of about 5.68 keV and maximum end-point energy of 18.6 keV. Detection of beta particle energy and abundance in a semiconductor detector could determine $^3H_2$ content in a reactor environment.

Example $^3H_2$ Sensor: To differentiate total $H_2$ concentration from solely $^3H_2$ concentration, one can employ a SiC detector with a different Schottky metal configuration. Shown in FIG. 3-FIG. 4, a Schottky metal structure of [Aurum-Yttrium]/Nickel Oxide ([Au—Y]/NiO) can be used to differentiate $^3H_2$ from $^1H$ isotope. Yttrium is attractive for this purpose with its high $H_2$ absorption/desorption velocity. As diatomic hydrogen (both $^1H$ and $^3H$ isotopes) contacts the yttrium (Y) metal, it dissociates into individual atoms which migrate towards the semiconductor layer. An anti-diffusion layer of nickel oxide (NiO) would prevent the atoms of $H_2$ from entering the semiconductor. In the case of $^3H_2$, as it decays to $^3He$ and emits a fast electron, the $^3He$ atom would be blocked from entering the NiO layer (FIG. 3), but the electrons could pass through the NiO layer into the SiC epitaxial layer (FIG. 4). Through this conduction path, the entered fast electrons could be detected, and the prevalence of electrons could differentiate $^3H_2$ content from total $H_2$ content.

Figure 3:
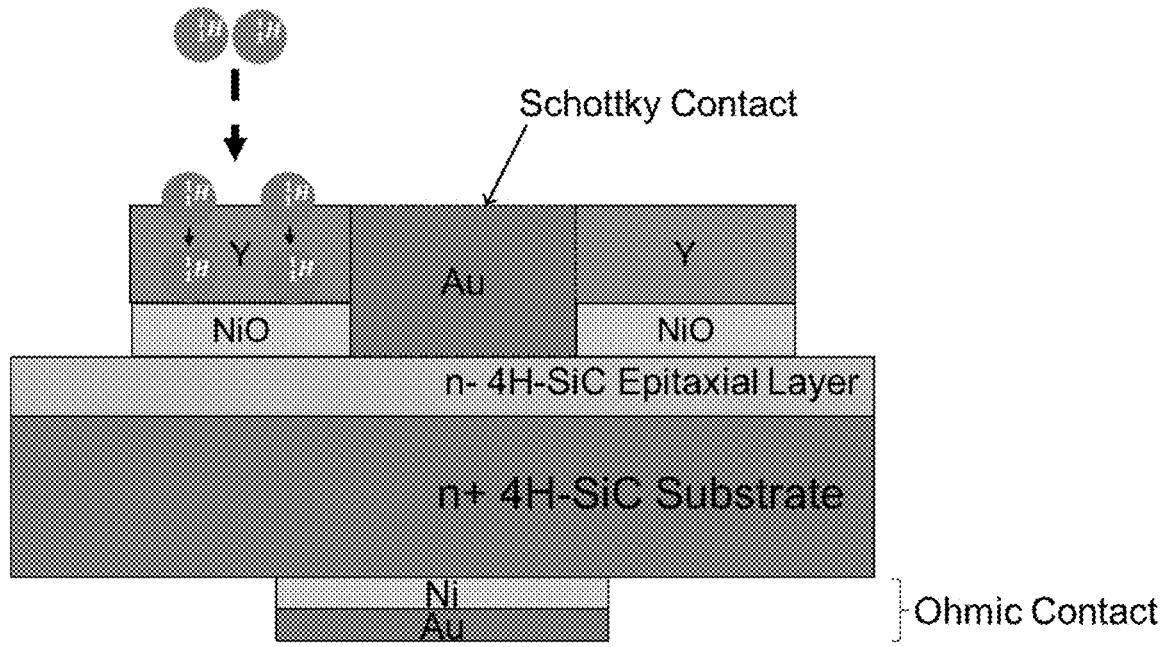
FIG. 3. Schematic cross-sectional diagram of tritium detection through beta decay in a SiC Schottky diode. Mechanism of blocking large H atoms from entering SiC epitaxial layer through the use of NiO anti-diffusion layer in the proposed SiC Schottky diode. There is no ionization and thus no signal.
Figure 4:
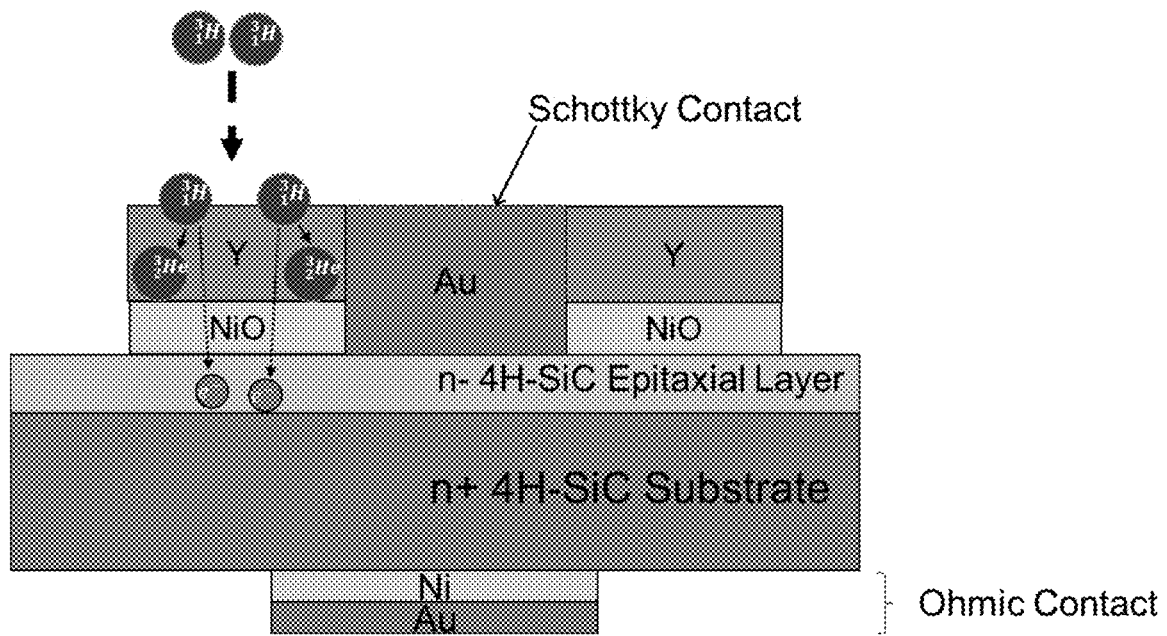
FIG. 4. Schematic cross-sectional diagram of tritium detection through beta decay in a SiC Schottky diode. SiC Schottky diode $^3H_2$ sensor with NiO/Y Au Schottky metal, indicating the penetration of characteristic beta particles of $^3H$ into the SiC epitaxial layer. Yttrium has a high hydrogen/tritium adsorption rate. The device functions by absorbing tritium atoms, which will be blocked by the NiO anti-diffusion layer. The emitted beta particles will however pass through NiO and introduce ionization in the epitaxial layer of SiC. Meanwhile, if it is hydrogen, there will be no ionization and thus no signal (FIG. 3).

A combination of a proven $H_2$ detector, shown in FIG. 1-FIG. 2, with a [Au—Y/NiO—SiC $^3H_2$ detector, shown in FIG. 3-FIG. 4, could be utilized in an advanced reactor in a Schottky-Ohmic structure. Here the Ohmic metal is again Ni on the n+ SiC substrate with an Au protective layer.

Example of SiC device for $H_2$ sensing: A SiC device can be fabricated based on the standard design of a $H_2$ sensor to establish a baseline for performance of the proposed $^3H_2$ sensor. Platinum (Pt) or another metal to dissociate diatomic $H_2$, can be deposited on the n-type 4-H SiC epitaxial layer using electron beam evaporation. Pt with the highest work function of all metals forms a Schottky barrier with n-type SiC. A bilayer Ni/Au metal can be deposited by e-beam evaporation on the back side of the n+ 4-H SiC substrate to form an Ohmic contact.

Simulations to estimate the thickness of the anti-diffusion layer: Monte Carlo (MC) simulations can be performed to estimate the thickness of nickel oxide (NiO) that can provide minimal energy loss of $^3H$ beta particles in NiO and enable them to reach the device depletion region. A 5.68 keV electron has an average maximum penetration depth of only 88 nm in NiO (calculated using CASINO software), whereas an 18.6 keV electron has an average maximum penetration depth of 630 nm, which is less than the continuous slowing down approximation range (total average path length) of 1710 nm inside NiO. Thus, an optimal thickness lesser than the average maximum penetration depth can be determined such that electrons transmitted through NiO have sufficient energy to create e-h pairs in the depletion region.

Example of SiC device for $^3H_2$ sensing: A SiC device can be fabricated based on the proposed design of $^3H_2$ sensor shown in FIG. 3-FIG. 4. NiO layer of a suitable thickness (see above) can be deposited on the epi-layer side to form an anti-diffusion layer. Yttrium (Y) layer of a suitable thickness can be deposited as an annular ring on top of NiO with a small gap in the center (FIG. 6). An Au Schottky metal can then be deposited in the center gap of the Y annulus after removing the NiO in that region to form a Schottky contact. A bilayer Ni/Au metal can be deposited on the substrate back side to form an Ohmic contact.

Sensor testing example in $^3H_2$ environment and performance validation: The fabricated SiC Schottky diodes can be evaluated for $^3H_2$ detection performance using a $^3H_2$ gas chamber. The SiC device can be exposed to a controlled environment of Ar with variable concentration of $^3H_2$ gas. Diode I-V characteristics can be measured at different $^3H_2$ concentrations ranging from 0 ppm to 500 ppm, for example, and higher. The bias voltage at which the diode current in a given $^3H_2$—Ar mixture indicates maximum shift $\Delta I$ from that in pure Ar can be determined. Subsequently, the diode current response can be acquired at this operating voltage as the $^3H_2$ concentration in the mixture is varied with time.

The SiC device with Pt Schottky contact, which represents a standard $H_2$ sensor, can be tested first to verify its detection performance. One should not see a difference in Pt—SiC sensor response between $H_2$ and $^3H_2$ exposures. Thus, this sensor response can serve as a baseline against which the [Au—Y]/NiO—SiC $^3H_2$ sensor response can be compared under similar conditions and $^3H_2$ exposures. A stability test for diode performance under extended operation can also be conducted by measuring its current response to a steady $^3H_2$ exposure for long measurement times such as several hours.

Sensitivity and Minimum Detectible Level of Tritium: A least-squares fitting can be performed on the [Au—Y]/NiO—SiC sensor data of current shift $\Delta I$ vs. $^3H_2$ concentrations. The least-squares method should produce a linear fit, in principle, the slope of which gives the diode sensitivity (S).

The detection limit of the $^3H_2$ sensor operating in a continuous current measurement mode (i.e., continuous sampling of analog current signal), which is expressed as a net diode current ($I_{limit}$) is given by 3.29 times the standard deviation of the dark current (Pan L et al. Nat Commun. 2021, 12, 5258). Dark current corresponds to the diode current obtained in the absence of $^3H_2$, and the net diode current is the difference between the current measured in $^3H_2$ and the dark current. Once the detection limit for net current is determined, the minimum detectible $^3H_2$ concentration can be estimated as $I_{limit}/S$.

Example 2

Described herein tritium sensor with tritium-hydrogen differentiation for reactors, fuel cycles, medicine, and nuclear applications.

The general principle for detection of tritium as described herein is based on the change in electrical resistivity of certain metals that can adsorb tritium gas, which in turn can produce additional charge in the metal, in adjacent oxide layers, or in a semiconductor due to ionization.

The devices disclosed herein are for tritium gas detection using wide band-gap semiconductor devices. Hydrogen gas detectors are already commercially available, but no such devices currently exist for detecting tritium. The devices disclosed herein will be able to detect tritium and distinguish signals from hydrogen. The devices can also be used as a standalone hydrogen detector. The devices can be applied for tritium detection in the nuclear power reactors, research reactors, and advanced reactors such as molten salt reactors, fuel cycles, hydrogen production, tritium production, medicine such as nuclear pharmaceuticals, medical research where tritium is used, and nuclear applications.

Example 3

Described herein are tritium sensors. The general principle for detection of tritium as described herein is based on the change in electrical resistivity of certain metals that can adsorb tritium gas, which in turn can produce additional charge in the metal, in adjacent oxide layers, or in a semiconductor due to ionization.

Figure 7:
FIG. 7. Schematic illustration of a metal-insulator-semiconductor Schottky diode for Tritium Gas Detection.

A schematic illustration of a metal-insulator-semiconductor Schottky diode for tritium gas detection is shown in FIG. 7. A Schottky-diode sensor is formed with a thin metal layer in direct contact with a semiconductor (metal semiconductor, MS) or a metal in contact with a thin insulator (e.g., silicon dioxide) layer on a semiconductor (metal-insulator-semiconductor, MIS) to form a rectifying junction which is explained by the alignment of the metal and semiconductor Fermi levels and the band bending theory. Schottky barrier height is the difference between the work functions of the metal and the semiconductor. When a catalytic metal, such as Pd or Pt, is used as the Schottky metal, hydrogen ($H_2$) or tritium gas ($^3H_2$) will adsorb onto its surface and dissociate into hydrogen (H) or tritium atoms ($^3H$). Assisted by the catalytic metal, H or $^3H$ atoms can diffuse through the metal and reach the metal-insulator interface, where they will form dipole layers, which shifts the metal work function due to polarization. The Schottky barrier height is changed, which results in a change in the electrical response of the device, thus serving as the indication of $H_2$ or $^3H_2$ gas. The additional free charge-carriers produced by $^3H$ beta particles can cause perturbation to this process and induce electrical signals that is indicative only of $^3H_2$ gas.

Figure 8:
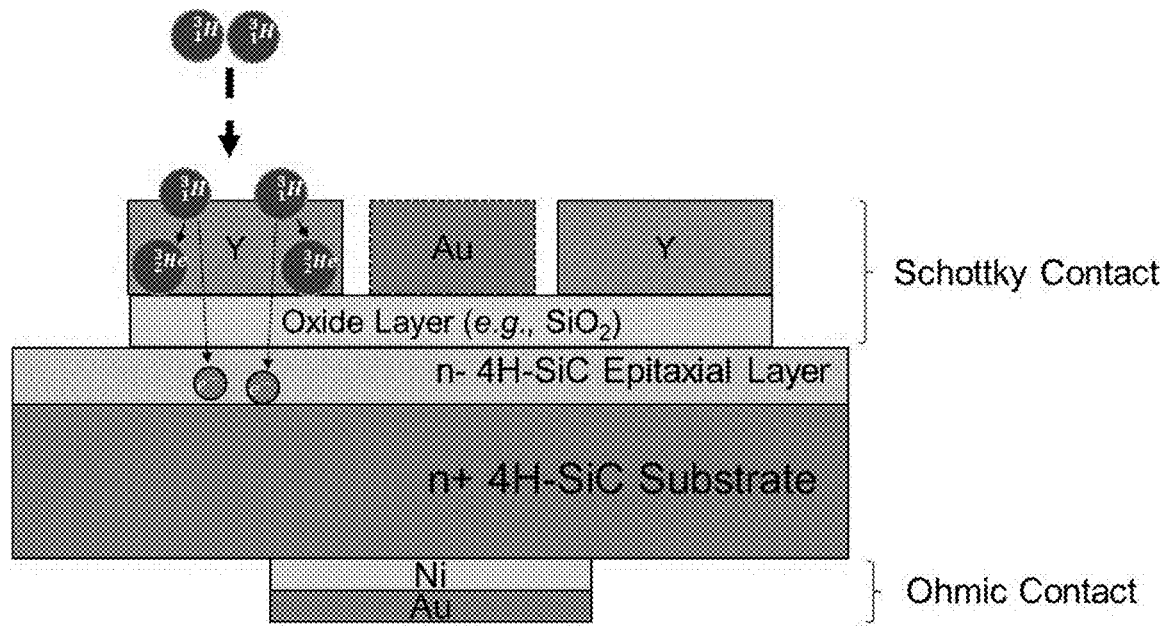
FIG. 8. Schematic illustration of tritium detection in a metal-oxide-semiconductor Schottky diode based on n-type SiC.
Figure 9:
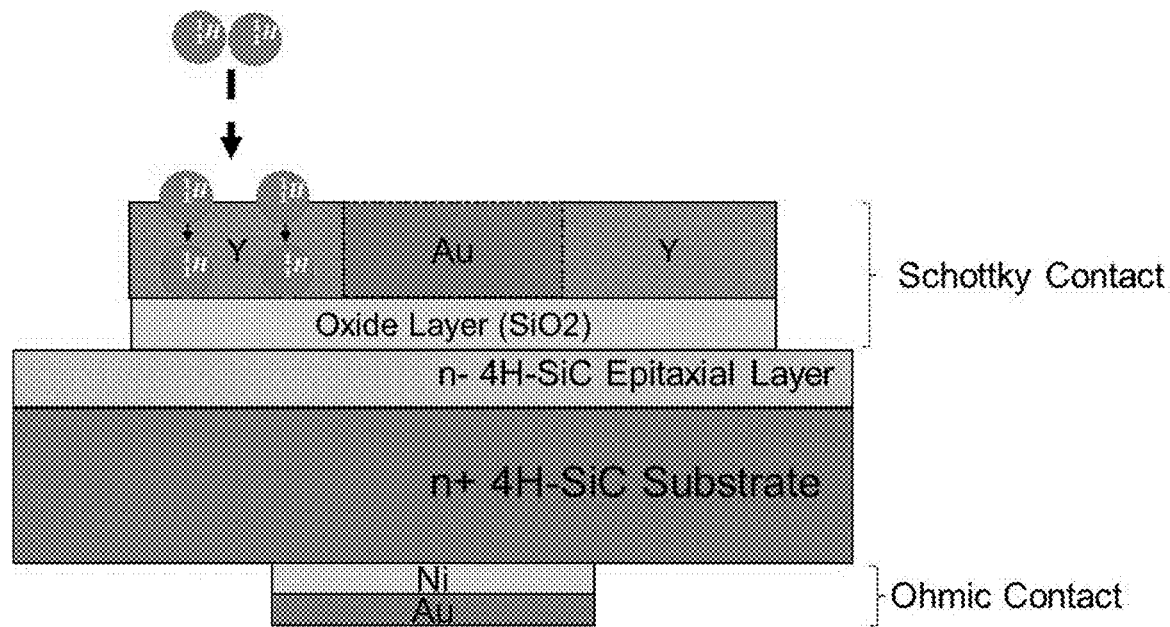
FIG. 9. Schematic illustration of hydrogen adsorption and dissociation in the metal-oxide-semiconductor Schottky diode based on n-type SiC.
Figure 10:
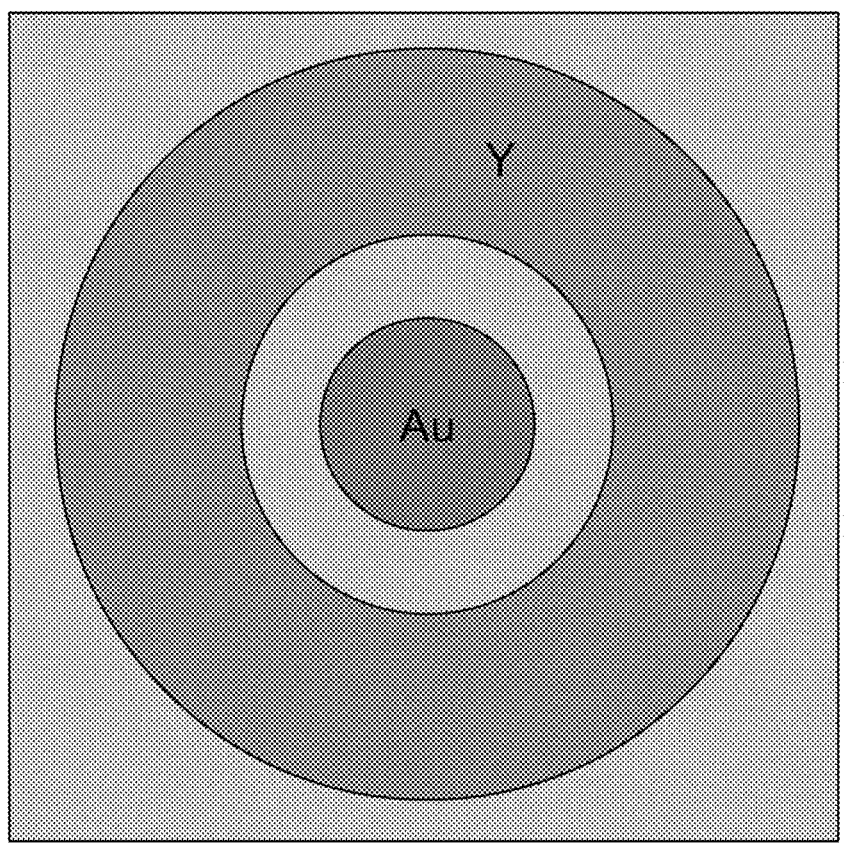
FIG. 10. Top down view of an example device as disclosed herein wherein the Y can be annular in shape and the Au is disposed in the center of the annular shape.

An example of detecting tritium in a MIS Schottky diode based on n-type SiC is shown in FIG. 8. A n⁻ 4H—SiC epitaxial layer on n⁺ 4H—SiC substrate is shown in FIG. 8. Au is the Schottky metal and a thin oxide layer (e.g., $SiO_2$) separates the Schottky metal and the epitaxial layer (FIG. 8). Ni is the Ohmic metal shown with a protective Au layer on top (FIG. 8). Yttrium (or Pt or Pd or other) is deposited around but separated with the Au Schottky metal as an annulus and serves as the catalytic metal (FIG. 8). Yttrium has a high $H_2/^3H_2$ adsorption rate. It functions by absorbing H or $^3H$ atoms that will diffuse to the metal and oxide layer interface, where the atoms are polarized and form a dipole layer. The dipole layer changes the metal (Au, in this example) work function and results in a change in the sensor signal. While $H_2$ is sensed only through polarization at the metal and oxide layer interface, $^3H_2$ can be sensed through both processes of polarization and ionization, wherein the beta particles emitted from $^3H$ will pass through the oxide layer and introduce ionization in the SiC epitaxial layer. This additional ionization caused by $^3H$ beta particles will induce an electrical signal change (such as voltage change) that is related to the tritium concentration. FIG. 9 is a schematic illustration of the process when only $H_2$ gas is present, which will only result in polarization at the Schottky metal and oxide layer interface, and does not cause any ionization in the epitaxial layer. An example top view of the device is shown in FIG. 10.

Figure 11:
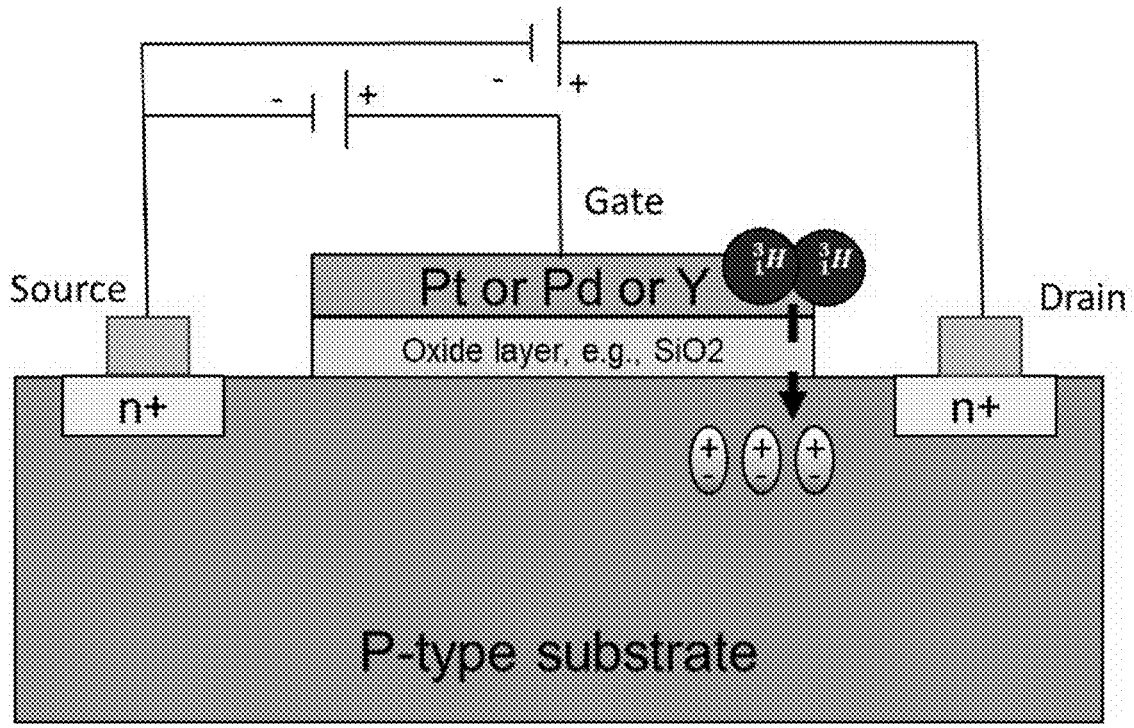
FIG. 11. Schematic illustration of the detection of tritium in a metal-insulator-semiconductor (MIS) field-effect transistor (FET).

A schematic illustration of the detection of tritium in a metal-insulator-semiconductor (MIS) field-effect transistor (FET) is shown in FIG. 11. The detection of tritium in a metal-insulator/oxide-semiconductor field effect transistor (MISFET or MOSFET) is further described herein. MISFET or MOSFET sensors that use a field effect transistor (FET)

can be used to detect $^3H_2$ based on change of the metal work function in the presence of $^3H_2$. The additional ionization caused by beta particles emitted by $^3H$ will induce an electrical signal change (such as voltage change) that is related to the $^3H_2$ concentration.

The MOSFET has a metal layer that has a catalytic property for the $^3H_2$ gas, similar to $H_2$ gas, deposited on a thin oxide layer between the metal and semiconductor. As in a traditional MOSFET, the catalytic metal layer can serve as the gate electrode, and the source and the drain regions are formed on the Si substrate, typically by ion-implantation. The positive voltage bias or potential can be applied to the gate. The absorption of $^3H$ atoms will change the threshold voltage, which is the voltage between gate and source at which a current starts to flow between the source and the drain. The conductivity of the semiconductor between the source and the drain changes according to the potential applied on the gate electrode, which will depend on the $^3H_2$ concertation.

The catalytic gate metal could be platinum (Pt), palladium (Pd), or an alloy containing these metals or another catalytic metal, which can be deposited, sputtered, or evaporated as a thin layer on the top of an oxide layer. Like $H_2$, $^3H_2$ can be adsorbed onto the metal surface, dissociated into atoms, and then diffused to the metal-insulator interface. The absorbed $^3H$ atoms can form a dipole layer to change the work function of the metal and can also create additional charge from ionization by $^3H$ beta particles emission, which in turn can result in a voltage change in the measured sensor signal.

This tritium detection can take an existing MOSFET as the base platform. The $H_2$ or $^3H_2$ sensitive catalytic metal can be the gate metal, where the $H_2$ or $^3H_2$ adsorption will occur. The gate metal dissociates the $H_2$ or $^3H_2$ into atoms that diffuse to the interface between metal and oxide layer. Polarization of H or $^3H$ atoms changes the metal work function, which changes the device's electrical response. In addition to polarization of $^3H$ atoms, the electrons emitted by $^3H$ will produce space charge and change the gate-source voltage that is needed to turn on the transistor, therefore working as a sensitive tritium detector. The gate oxide thickness (few tens of nm) can be tuned to achieve optimum tritium sensitivity.

Step 1: Pt or Pd or Y metal absorbs $^3H$ or H atoms.

Step 2: In the case of $^3H$ absorption, fast electrons (average energy 5.68 keV) emitted by $^3H$ cause ionization in both the oxide layer and the p-type substrate.

Step 3: The produced charge will accumulate and get trapped inside the oxide layer, and at oxide-semiconductor interface generating potential.

Step 4: The potential will alter the threshold voltage between gate and source, which can cause inversion in the P-type region, therefore changing the electrical response, which serves as the indication of tritium detection.

Figure 12:
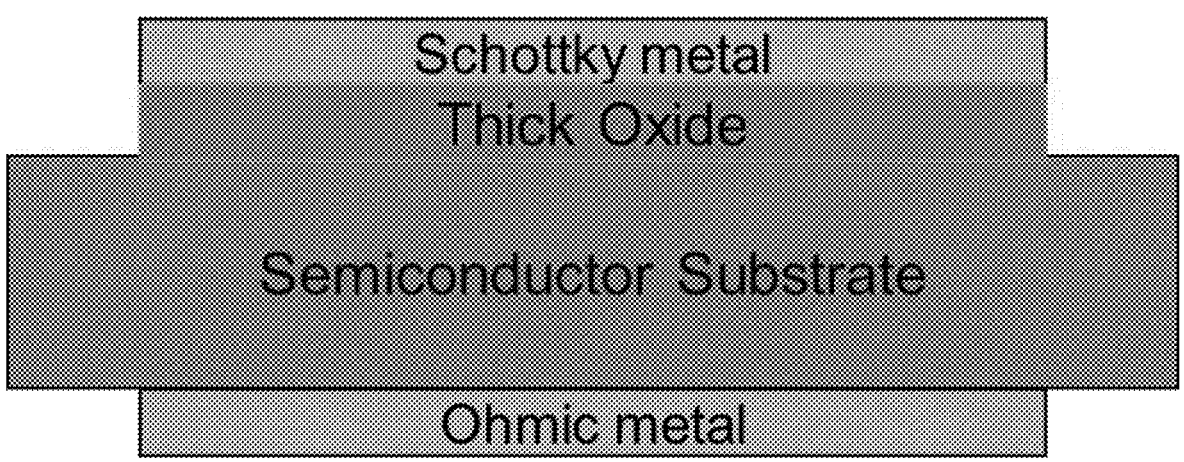
FIG. 12. Schematic illustration of a metal-insulator-semiconductor capacitor.

Also described herein is the detection of tritium in capacitor mode, such as a metal-insulator-semiconductor (MIS) capacitor (FIG. 12). The tritium gas and the related concentration can be detected by the capacitance shift in MIS capacitor. The oxide layer is thick enough to absorb all the electrons from tritium beta-minus decay. The charge produced by ionization will build up in the oxide layer, adding to the charge or neutralizing the charge already built up by the absorption of $^3H$ at the metal-oxide interface, which in turn will produce an electrical signal or a change in the electrical signal for the detection of $^3H_2$ gas concentration. The oxide layer could, for example, be $SiO_2$, $Al_2O_3$, $Si_3N_4$, or $Ta_2O_5$.

Other advantages which are obvious and which are inherent to the invention will be evident to one skilled in the art. It will be understood that certain features and sub-combinations are of utility and may be employed without reference to other features and sub-combinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

The methods of the appended claims are not limited in scope by the specific methods described herein, which are intended as illustrations of a few aspects of the claims and any methods that are functionally equivalent are intended to fall within the scope of the claims. Various modifications of the methods in addition to those shown and described herein are intended to fall within the scope of the appended claims. Further, while only certain representative method steps disclosed herein are specifically described, other combinations of the method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

What is claimed is:

1. A tritium detection device comprising:
   a tritium detection region comprising:
      a tritium absorption layer; and
      an anti-diffusion layer;
   a Schottky contact region comprising a Schottky contact layer;
   a semiconductor layer, the semiconductor layer being a layer comprising a semiconductor;
   an epitaxial semiconductor layer, the epitaxial semiconductor layer being an epitaxial layer of the semiconductor; and
   an Ohmic contact layer;
   wherein the epitaxial semiconductor layer is disposed on top of and in physical contact with the semiconductor layer;
   wherein the tritium detection region covers a first portion of the epitaxial semiconductor layer and the Schottky contact region covers a second portion of the epitaxial semiconductor layer;
   wherein the anti-diffusion layer is disposed on top of and in physical contact with the first portion of the epitaxial semiconductor layer;
   wherein the tritium absorption layer is disposed on top of and in physical contact with the anti-diffusion layer, such that the anti-diffusion layer is disposed between and in physical contact with the tritium absorption layer and the epitaxial semiconductor layer;
   wherein the Schottky contact layer is disposed on top of and in physical contact with the second portion of the epitaxial semiconductor layer;
   wherein the first portion of the epitaxial semiconductor layer is adjacent to the second portion of the epitaxial semiconductor layer, such that the Schottky contact region is disposed adjacent to the tritium detection region on the epitaxial semiconductor layer; and
   wherein the Ohmic contact layer is disposed below and in physical contact with the semiconductor layer, such that the semiconductor layer is disposed between and in physical contact with the epitaxial semiconductor layer and the Ohmic contact layer.

2. The device of claim 1, wherein:
the tritium absorption layer has an average thickness of from 10 nanometers (nm) to 20 micrometers (μm);
the anti-diffusion layer has an average thickness of from 1 nm to 1000 nm;
the Schottky contact layer has an average thickness of from 10 nm to 20 μm;
the semiconductor layer has an average thickness of from 50 nm to 500 μm;
the epitaxial semiconductor layer has an average thickness of from 10 nm to 100 μm;
the Ohmic contact layer has an average thickness of from 10 nm to 20 μm;
or a combination thereof.

3. The device of claim 1, wherein the tritium absorption layer comprises a metal selected from the group consisting of Y, Ni, Ti, Pt, Pd, Mg, Li, Na, Al, Zn, Mn, Ca, Fe, Ba, La, Sn, Cu, Co, Ru, Ir, Se, carbon nanotubes, or a combination thereof.

4. The device of claim 1, wherein the tritium absorption layer comprises a metal selected from the group consisting of Y, Ni, Ti, or a combination thereof.

5. The device of claim 1, wherein the anti-diffusion layer comprises an oxide, a nitride, or a combination thereof.

6. The device of claim 1, wherein the anti-diffusion layer comprises NiO, $SiO_2$, $Al_2O_3$, $Si_3N_4$, $Ta_2O_5$, or a combination thereof.

7. The device of claim 1, wherein the Schottky contact layer is in physical contact with at least a portion of the anti-diffusion layer, wherein the Schottky contact layer is not in physical contact with the tritium absorption layer, or a combination thereof.

8. The device of claim 1, further comprising a hydrogen detection region comprising a hydrogen absorption and dissociation layer, wherein the hydrogen absorption and dissociation layer is disposed on top of and in physical contact with the epitaxial semiconductor layer, such that the hydrogen detection region covers a third portion of the epitaxial semiconductor layer.

9. The device of claim 8, wherein the hydrogen detection region is not in physical contact with the tritium detection region, the Schottky contact region, or a combination thereof.

10. The device of claim 8, wherein the hydrogen absorption and dissociation layer comprises a metal selected from the group consisting of Pt, Pd, Ni, Mn, Fe, Li, Na, Mg, Al, Ti, La, Sn, Zinc, Cu, Co, Ru, Ir, Se, or a combination thereof.

11. The device of claim 8, wherein the hydrogen absorption and dissociation layer comprises a metal selected from the group consisting of Pt, Pd, or a combination thereof.

12. The device of claim 8, wherein the hydrogen absorption and dissociation layer has an average thickness of from 10 nm to 20 μm.

13. The device of claim 1, wherein the device comprises a field effect transistor.

14. A method of use of the device of claim 1, wherein the method comprises:
exposing the tritium detection region of the device to an environment having an atmosphere comprising tritium, hydrogen, or a combination thereof, such that the atmosphere contacts the tritium detection region and generates a first electromagnetic signal;
measuring the first electromagnetic signal; and
processing the first electromagnetic signal to determine a first property of the atmosphere.

15. The method of claim 14, wherein the first property comprises the presence of tritium in the atmosphere, the concentration of tritium in the atmosphere, or a combination thereof.

16. The method of claim 14, wherein the first electromagnetic signal is generated by a beta particle produced by beta-decay of the tritium.

17. The method of claim 14, wherein the environment is present in a nuclear reactor site, a nuclear waste location, a fuel cycle facility, a nuclear medicine facility, a hydrogen production facility, a tritium production facility, a molten salt reactor, or a combination thereof.

18. A method of use of the device of claim 9, wherein the method comprises:
exposing the tritium detection region and the hydrogen detection region of the device to an environment having an atmosphere comprising tritium, hydrogen, or a combination thereof, such that:
the atmosphere contacts the tritium detection region and generates a first electromagnetic signal, and
the atmosphere contacts the hydrogen detection region and generates a second electromagnetic signal;
measuring the first electromagnetic signal and the second electromagnetic signal;
processing the first electromagnetic signal to determine a first property of the atmosphere; and
processing the second electromagnetic signal to determine a second property of the atmosphere.

19. The method of claim 18, wherein:
the first property comprises the presence of tritium in the atmosphere, the concentration of tritium in the atmosphere, or a combination thereof;
the second property comprises the presence of hydrogen in the atmosphere, the concentration of hydrogen in the atmosphere, or a combination thereof;
or a combination thereof.

20. The method of claim 18, wherein the environment is present in a nuclear reactor site, a nuclear waste location, a fuel cycle facility, a nuclear medicine facility, a hydrogen production facility, a tritium production facility, a molten salt reactor, or a combination thereof.

* * * * *